(12) United States Patent
Fülling et al.

(10) Patent No.: US 9,586,698 B2
(45) Date of Patent: Mar. 7, 2017

(54) AIR PASSENGER STAIR OR BRIDGE WITH AN APPROXIMATELY U-SHAPED PORTAL FRAME DISPOSED AT THE FRONT OF THE AIR PASSENGER STAIR OR BRIDGE FOR RECEIVING A CANOPY ROOF

(71) Applicant: Hübner GmbH & Co. KG, Kassel (DE)

(72) Inventors: Jürgen Fülling, Trendelburg (DE); Jens Karasek, Kaufungen (DE); Heinz Schuster, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 14 days.

(21) Appl. No.: 14/281,133

(22) Filed: May 19, 2014

(65) Prior Publication Data
US 2014/0338136 A1    Nov. 20, 2014

(30) Foreign Application Priority Data

May 18, 2013    (EP) ................... 13002635

(51) Int. Cl.
*E01D 15/00*    (2006.01)
*B64F 1/305*    (2006.01)

(52) U.S. Cl.
CPC ................ *B64F 1/3055* (2013.01)

(58) Field of Classification Search
CPC .............................. B64F 1/30–1/32
USPC .............................. 404/69.5–72.5
See application file for complete search history.

(56) References Cited

U.S. PATENT DOCUMENTS

| | | | | |
|---|---|---|---|---|
| 3,639,934 A * | 2/1972 | Eggert, Jr. | | 14/71.5 |
| 3,644,952 A * | 2/1972 | Hatch | | 14/71.5 |
| 3,693,204 A * | 9/1972 | Eggert, Jr. | | 14/71.5 |
| 3,703,737 A * | 11/1972 | Eggert, Jr. | | 14/71.5 |
| 3,711,881 A * | 1/1973 | Chapman et al. | | 14/71.5 |
| 3,816,867 A * | 6/1974 | Shirzad et al. | | 14/71.5 |
| 4,120,067 A * | 10/1978 | Hone et al. | | 14/71.5 |
| 4,333,195 A * | 6/1982 | Lichti | | 14/71.5 |
| 7,269,871 B2 * | 9/2007 | Koch et al. | | 14/71.5 |
| 7,690,065 B2 | 4/2010 | Muller et al. | | |
| 2009/0223055 A1 * | 9/2009 | Wendorf et al. | | 30/28 |

FOREIGN PATENT DOCUMENTS

WO    WO-2013050839 A1    4/2013

* cited by examiner

*Primary Examiner* — Raymond W Addie
(74) *Attorney, Agent, or Firm* — Dinsmore & Shohl LLP; Douglas L. Wathen

(57) ABSTRACT

An air passenger stair or an air passenger bridge (1) with an approximately U-shaped portal frame (3) disposed on the front end of the air passenger stair or bridge (1) for receiving a canopy roof (10), the canopy roof comprising at least one bellows (5) and an actuation device (9) for the bellows, wherein, in order to connect at least the actuation device (9) of the canopy roof (10) with the portal frame (10), an adapter device is disposed on the portal frame (3).

13 Claims, 3 Drawing Sheets

AIR PASSENGER STAIR OR BRIDGE WITH AN APPROXIMATELY U-SHAPED PORTAL FRAME DISPOSED AT THE FRONT OF THE AIR PASSENGER STAIR OR BRIDGE FOR RECEIVING A CANOPY ROOF

CROSS REFERENCE TO RELATED APPLICATIONS

This application claims priority of European Patent Application No. 13 002 636.2, filed May 18, 2013, the content of which is incorporated herein in its entirety.

FIELD OF THE INVENTION

The object of the invention is an air passenger stair or bridge with an approximately U-shaped portal frame disposed at the front of the air passenger stair or bridge for receiving a canopy roof, the canopy roof comprising at least one bellows and an actuation device for the bellows.

BACKGROUND OF THE INVENTION

Such air passenger stairs or air passenger bridges are known. Air passenger stairs or bridges usually have a so-called pleated canopy roof disposed at its front free end, the canopy roof bridging the gap between the air passenger stair or bridge and the fuselage of the aircraft. This means that the canopy roof forms a gangway protection between the air passenger stair or bridge on the one hand and the aircraft on the other hand.

Such a canopy roof is known from DE 10 2004 016 272 B4. The canopy roof comprises two articulated arms disposed in a horizontally spaced-apart relationship, which are disposed in an articulated manner on the approximately U-shaped portal frame of the air passenger stair or bridge. A second articulated connection receives a piston cylinder drive, more specifically a gas pressure spring. The drive is articulately connected to the articulated arm and which causes the extension movement of the respective articulated arm. The second articulated connection is respectively located under the articulated arrangement of the two articulated arms on the portal frame of the air passenger stair or bridge. The articulated arms themselves have a flexible U-shaped frame at their front free end, the U-shaped frame comprising a so-called bumper with which the frame comes to rest on the outer skin of the aircraft in the area of the access opening. A drive is provided for controlling the extension movement. Such a drive comprises two rolls. One roll is fastened on the portal frame above each respective articulated arm. Such a roll serves to receive a traction means, e.g. a rope or a strap, the end of the rope or the strap being connected to the end of the articulated arm in the area of the U-shaped frame with the bumper. The two spaced-apart rolls are connected to each other by a shaft, the shaft being driven by a motor, for example a tubular motor. A circumferential folded roof, which is also U-shaped, is provided between the front side U-shaped frame and the portal frame of the air passenger stair or bridge.

Many manufacturers are offering air passenger stairs and air passenger bridges. Thereby, the portal frames of the individual air passenger stairs or air passenger bridges are configured in such a manner that the connection for the articulated arm or the piston cylinder drive but also the fastening of the roll above the articulated arm cannot take place in any point. This means that, depending on the constructor, completing an air passenger stair or an air passenger bridge with the corresponding canopy roof always causes considerable engineering and mounting efforts. As has already been explained, the reason for this is that one must first determine, for each air passenger stair or air passenger bridge of each manufacturer, in which points the connection of the previously described components can occur, in order to design the geometry, i.e. the relation between the parts, in such manner that such a canopy roof is functional.

The canopy roof comprises an actuation device and a U-shaped bellows configured as a pleated or corrugated bellows. In addition, the actuation device comprises the two articulated arms with the corresponding piston cylinder drives, which are preferably configured as gas pressure springs. The piston cylinder drives provide the extension movement of the canopy roof or the actuation device.

SUMMARY OF THE INVENTION

The problem underlying the invention consists in finding a remedy to the afore-mentioned disadvantages. The purpose of the invention is more specifically to be able to attach a pre-assembled canopy roof regardless of the manufacturer and regardless of the respective air passenger stair or air passenger bridge to be equipped with a canopy roof.

In order to solve the problem, the invention proposes to dispose an adapter device on the portal frame for connecting at least the actuation device of the canopy roof to the portal frame. This means that the canopy roof features an adapter device on the side of the portal frame, which allows fastening the canopy roof to the portal frame, because it is then only necessary to make the appropriate boreholes on the adapter device, in order to connect it by means of screws or rivets to the portal frame of the air passenger stair or air passenger device.

Thus, according to a particularly advantageous embodiment, it is provided that the adapter device comprises at least two support beams, respectively one support beam being disposed on a leg of the approximately U-shaped portal frame oriented vertically in the mounted state. From this it is clear that the canopy roof is equipped with only two support beams, by means of which the canopy roof is fastened as a whole to the portal frame.

According to another feature of the invention, the support beam, which has an approximately U-shaped cross-section, has at least one first and one second joint axis disposed one above each other. A lower piston cylinder drive for the articulated arm is connected to the one first lower joint axis and an articulated arm of the actuation device of the canopy roof is connected to the one second upper joint axis. This means, that lugs for receiving the joint axes for the articulated arm and the lower piston cylinder drive, e.g. a gas pressure spring, are located in the area of the legs of the support beam with a U-shaped cross-section. An articulated connection is required since both the articulated arm and the lower piston cylinder drive pivot when extending the articulated arm.

According to another feature of the invention, it is provided that above the first upper joint axis, the support beam comprises a roll for a traction element, e.g. a rope or a strap, as part of the drive for the articulated arms. The articulated arms are charged with pressure by the piston cylinder drives, which are configured more specifically as gas pressure springs. According to another feature of the invention, the rolls attributed to the two articulated arms are connected to each other by a shaft, which is driven more specifically by a motor, for example by a tubular motor. The rolls are rotated by the tubular motor and the traction element, e.g. a strap, is consequently rolled-up or unrolled from the respective roll, thus controlling the extension and retraction movement of the canopy roof. The principle of this is sufficiently known from the DE 10 2004 016 272 B4 cited above. Alternately it is of course also possible to drive the rolls individually.

In the following, the invention is exemplarily described in more detail based on the drawings.

Figure 1:
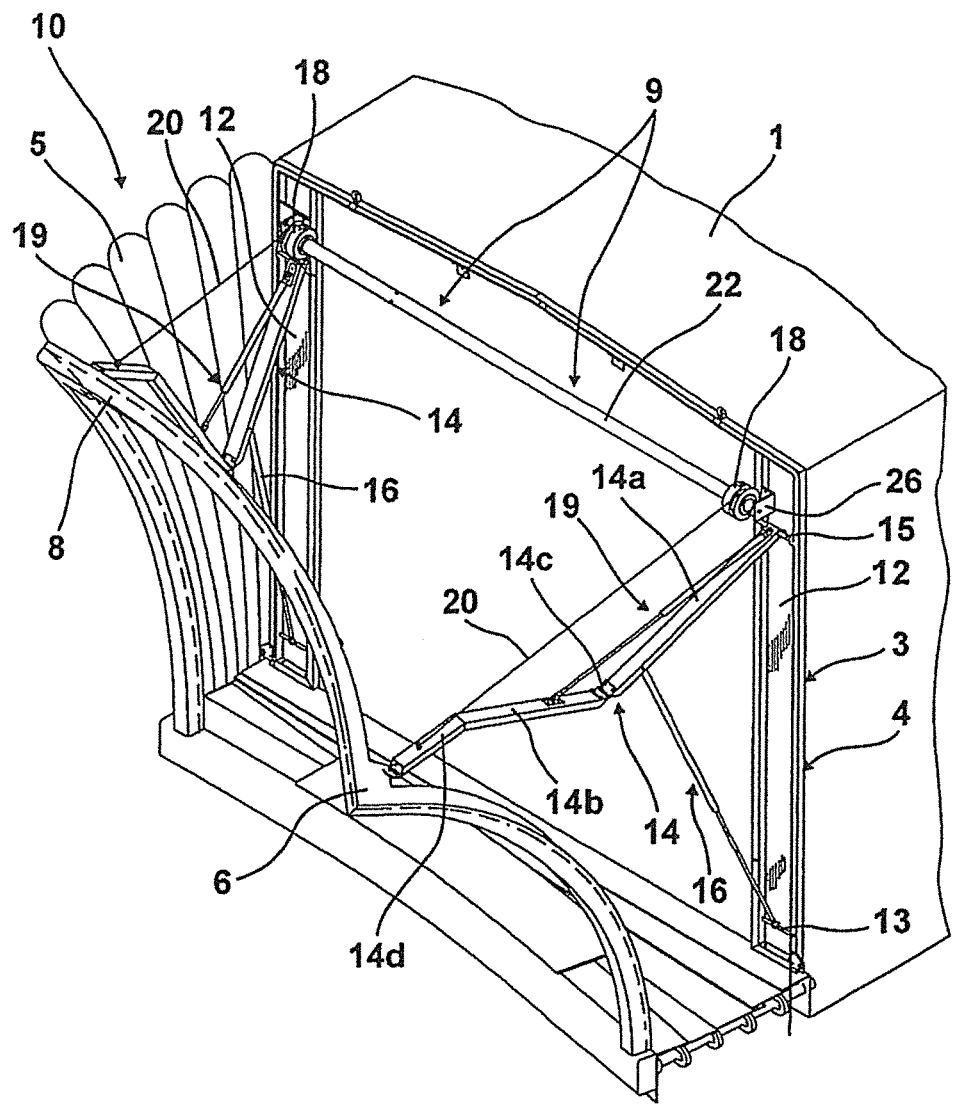
FIG. 1 is a schematic view of a portion of an air passenger stair or air passenger bridge with the front side portal frame and canopy roof, the bellows between the flexible frame and the portal frame being partially shown.

In the schematic view of FIG. 1, one can see a portion of the air passenger stair or air passenger bridge labelled 1, which comprises an approximately U-shaped portal frame 3 on the front side. The canopy roof labelled 10 as a whole is located on the portal frame 3, the bellows 5 of the canopy roof being only partially shown for more clarity. In addition to the bellows 5, the canopy roof comprises the actuation device labelled 9 as a whole. The actuation device 9 comprises amongst others the two articulated arms 14 and the two lower piston cylinder drives 16. In order to connect the canopy roof 10 to the portal frame 3, respectively one support beam 12 is disposed on the vertical legs 4 of the approximately U-shaped portal frame 3. The articulated arm 14 and the lower piston cylinder drive 16 are pivotably mounted on the support beam 12 by means of respectively one pivot joint. In addition, a roll 18 for receiving a traction means 20, e.g. a rope or a strap, which is connected to the articulated arm 14 at its end, is located above the articulation of the articulated arm 14 on the support beam 12. Hereby a roll 18 is attributed to each articulated arm 14, the rolls 18 being connected to each other by a shaft 22, which is driven by a motor, e.g. by a tubular motor.

The flexible frame 6 with the bumper 8, which comes in contact with the wall of the aircraft when the canopy roof 10 comes to rest on the aircraft, is disposed at the front end of the articulated arm. The front end of the bellows 5 is fastened to the flexible frame 6. In the area of the portal, the bellows 5 is connected to the portal frame and/or with the support beam 12 (FIG. 1).

Figure 2:
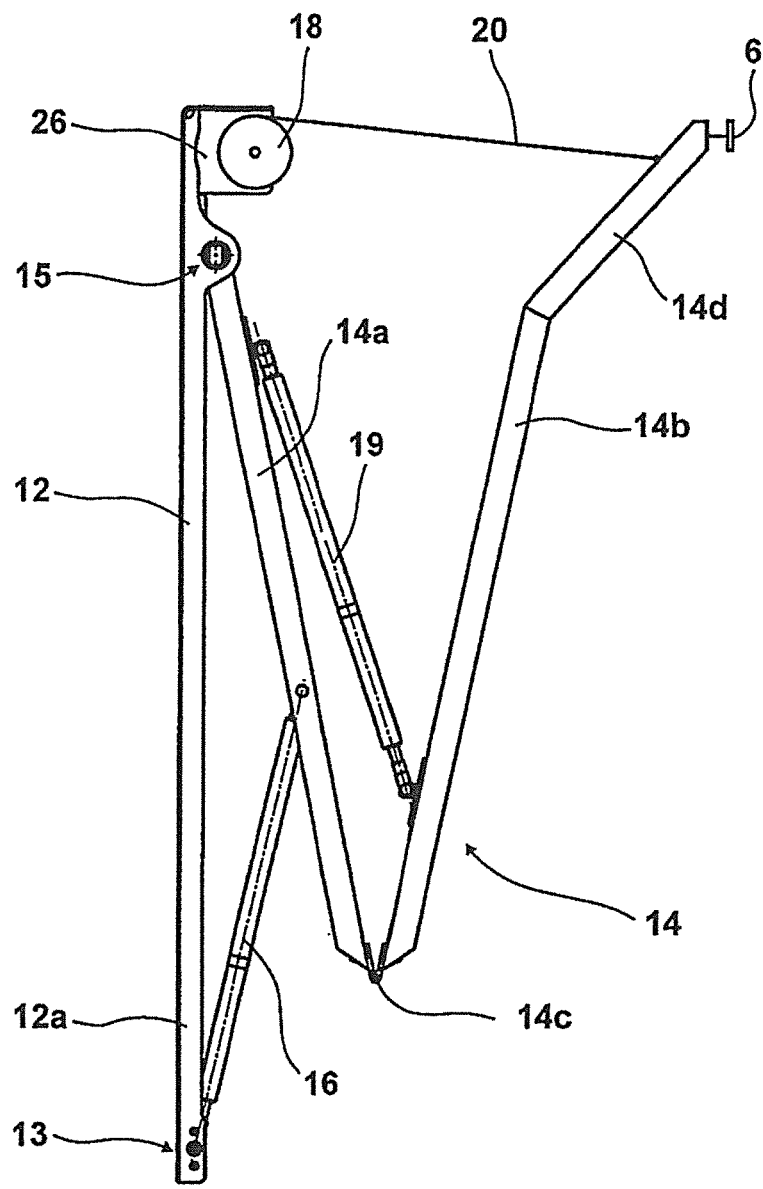
FIG. 2 is a lateral view of the support beam with the articulated arm, the piston cylinder drive and the rolls.
Figure 3:
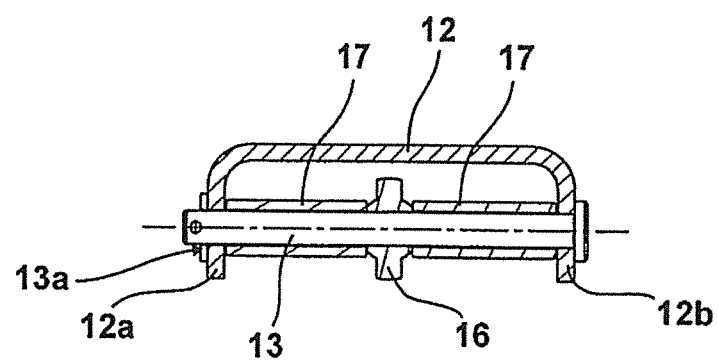
FIG. 3 is a cross-sectional view of the support beam in the area of the joint axis for the piston cylinder drive.
Figure 4:
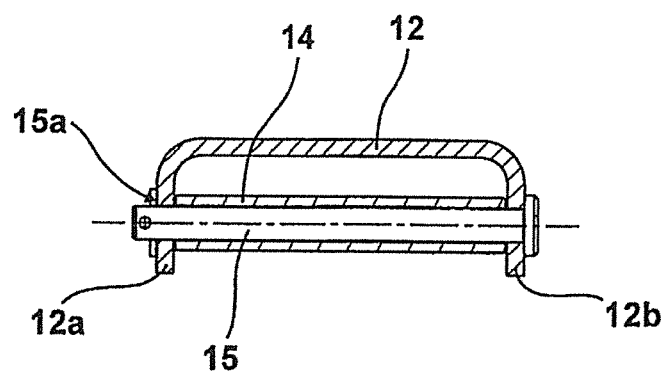
FIG. 4 is a cross-sectional view of the support beam in the area of the joint axis for the articulated arm.

The object of the invention is the configuration of the support beam, reference being specifically made to FIGS. 2 to 4 in this regard. The support beam 12 has an approximately U-shaped cross-section, as can be gathered immediately by looking at FIGS. 3 and 4. As can be gathered from FIG. 3, the support beam 12 features respectively one lug 13a in the area of the support beam legs 12a, 12b for receiving the first lower joint axis labelled 13. The lower piston cylinder drive 16 is articulated on the first lower joint axis 13, sleeves 17 being provided respectively on both sides of the lower piston cylinder drive 16 for centring the lower piston cylinder drive 16.

The connection of the articulated arm 14 on the support beam 12 can be gathered by looking at FIG. 4. Here, lugs 15a are again provided in the legs 12a, 12b for receiving a second upper joint axis 15, the second upper joint axis pivotably receiving the articulated arm 14.

A roller block 26 for receiving the roll 18 is located above the articulated connection of the articulated arm 14 to the support beam 12. The roll 18 is connected to the end of the articulated arm 14 via the rope serving as a traction element 20 (FIG. 2).

The articulated arm 14 comprises an upper arm 14a and a lower arm 14b, which are connected to each other by way of a hinge joint 14c. The lower arm 14b additionally features an end member 14d that is angled relative to the lower arm 14. Another piston drive 19, which serves to extend the articulated arm 14 just as the piston cylinder drive 16, is located between the upper arm 14a and the lower arm 14.

LIST OF REFERENCE NUMBERS 1 air passenger stair or bridge
3 portal frame
4 leg of the portal frame
5 bellows
6 flexible frame
8 bumper on the flexible frame
9 actuation device
10 canopy roof
12 support beam
12a leg of the support beam 12
12b leg of the support beam 12
13 first lower joint axis for the lower piston cylinder
14 drive
13a lug for the joint axis
14 articulated arm
14a upper arm
14b lower arm
14c hinge joint
14d end member
15 second upper joint axis for the articulated arm
15a lug for the joint axis
16 lower piston cylinder drive
17 sleeve
18 roll
19 upper piston cylinder drive
20 traction element
22 shaft
26 roller block

The invention claimed is:

1. A canopy roof and adapter device for connecting the canopy roof to a front end of an air passenger stair or bridge of the type having a generally U-shaped portal frame with a pair of spaced apart vertical legs, the canopy roof and adapter device comprising:

a canopy roof having at least one bellows and an actuation device for the bellows; and an adapter device configured to be disposed on a generally U-shaped portal frame at a front end of an air passenger stair or bridge, the adapter device connecting the actuation device to the portal frame, the adapter device having two vertical support beams each disposed on one of the vertical legs of the U-shaped portal frame, at least one of the support beams having a first lower joint axis and a second upper joint axis disposed above the first lower joint axis, the actuation device of the canopy roof including a lower piston cylinder drive connected to the first lower joint axis and an articulated arm connected to the second upper joint axis;

whereby the support beams allow a pre-assembled canopy roof to be attached to the U-shaped portal frame by attaching the support beams to the U-shaped portal frame.

2. A canopy roof and adapter device in accordance with claim 1, wherein:
the actuation device further comprises a second articulated arm and a second lower piston cylinder drive associated with the second articulated arm.

3. A canopy roof and adapter device in accordance with claim 1, wherein:
the support beams each have an approximately U-shaped cross-section with a pair of spaced apart legs; and
each of the joint axes extending between the spaced apart legs.

4. A canopy roof and adapter device in accordance with claim 1, further comprising:
a roll with a traction element operable as a drive for the articulated arm, the roll being disposed on the at least one of the support beams above the second upper joint axis.

5. A canopy roof and adapter device in accordance with claim 4, wherein:
the roll is driven.

6. A canopy roof and adapter device in accordance with claim 1, further comprising:
a second lower piston cylinder drive;
and a second articulated arm;
each of the support beams having at least one first lower and one second upper joint axis disposed above each other, one of the lower piston cylinder drives being disposed on the one first lower joint axis of each of the support beams and one of the articulated arms being disposed on the one second upper joint axis of each of the support arms;
two rolls each with a traction element operable as a drive for one of the articulated arms, the rolls each being disposed on a respective one of the support beams above the second upper joint axis; and
a shaft connecting the rolls to each other, the shaft equipped with a motor drive.

7. An air passenger stair or bridge system, comprising:
an air passenger stair or bridge having a front end with a generally U-shaped portal frame; and
a canopy roof and adapter in accordance with claim 1;
wherein the adapter is disposed on the generally U-shaped portal frame so as to connect the actuation device to the portal frame.

8. An air passenger stair or bridge system, comprising:
an air passenger stair or bridge having a front end with a generally U-shaped portal frame with a pair of spaced apart vertical legs;
a canopy roof having at least one bellows and an actuation device for the bellows; and
an adapter device disposed on the generally U-shaped portal frame, the adapter device connecting the actuation device to the portal frame, the adapter device having two vertical support beams each disposed on one of the vertical legs of the U-shaped portal frame, at least one of the support beams having a first lower joint axis and a second upper joint axis disposed above the first lower joint axis, the actuation device of the canopy roof including a lower piston cylinder drive connected to the first lower joint axis and an articulated arm connected to the second upper joint axis;
whereby the support beams attach the canopy roof to the U-shaped portal frame.

9. An air passenger stair or bridge system in accordance with claim 8, wherein:
the actuation device further comprises a second articulated arm and a second lower piston cylinder drive associated with the second articulated arm.

10. An air passenger stair or bridge system in accordance with claim 8, wherein:
the support beams each have an approximately U-shaped cross-section with a pair of spaced apart legs; and
each of the joint axes extending between the spaced apart legs.

11. An air passenger stair or bridge system in accordance with claim 9, further comprising:
a roll with a traction element operable as a drive for the articulated arms, the roll being disposed on the at least one of the support beams above the second upper joint axis.

12. An air passenger stair or bridge system in accordance with claim 11, wherein:
the roll is driven.

13. An air passenger stair or bridge system in accordance with claim 8, further comprising:
a second lower piston cylinder drive;
and a second articulated arm;
each of the support beams having at least one first lower and one second upper joint axis disposed above each other, one of the lower piston cylinder drives being disposed on the one first lower joint axis of each of the support beams and one of the articulated arms being disposed on the one second upper joint axis of each of the support arms;
two rolls each with a traction element operable as a drive for one of the articulated arms, the rolls each being disposed on a respective one of the support beams above the second upper joint axis; and
a shaft connecting the rolls to each other, the shaft equipped with a motor drive.

\* \* \* \* \*